United States Patent [19]

Ikeno et al.

[11] Patent Number: 4,722,987

[45] Date of Patent: Feb. 2, 1988

[54] METHOD FOR THE PREPARATION OF AN ORGANOPOLYSILOXANE

[75] Inventors: Masayuki Ikeno, Annaka; Hiroshi Inomata, Takasaki, both of Japan

[73] Assignee: Shin-Etsu Chemical Co., Ltd., Tokyo, Japan

[21] Appl. No.: 896,215

[22] Filed: Aug. 14, 1986

[30] Foreign Application Priority Data

Aug. 16, 1985 [JP] Japan .................. 60-180348

[51] Int. Cl.$^4$ ............................... C08G 77/06
[52] U.S. Cl. ...................... 528/23; 528/21; 528/33; 528/38; 528/37; 528/12; 556/459; 556/462; 556/466
[58] Field of Search ............ 528/23, 21, 33, 38, 528/37, 12; 556/459, 462, 466

[56] References Cited

U.S. PATENT DOCUMENTS 4,008,346  2/1977  Moeller ................. 528/23
4,341,888  7/1982  Razzano ................. 528/37

Primary Examiner—Melvyn I. Marquis
Attorney, Agent, or Firm—Hopgood, Calimafde, Kalil, Blaustein & Judlowe

[57] ABSTRACT

An oligomer or a mixture of organopolysiloxane oligomers is polymerized in the presence of a strong acid, e.g. trifluoromethane sulfonic acid, as the catalyst to give an organopolysiloxane containing a considerable amount of silanolic hydroxy groups at the molecular chain ends. Thereafter, the mixture is admixed with water and a hexaorganodisilazane or triorganosilyl amine compound in combination so as to neutralize the acid catalyst by the ammonia produced by the hydrolysis of the disilazane or silyl amine compound with simultaneous silylation of the terminal hydroxy groups. Thus, the organopolysiloxane contains a greatly decreased amount of the residual silanolic hydroxy groups at the molecular chain ends to be imparted with remarkably improved heat stability.

3 Claims, No Drawings

METHOD FOR THE PREPARATION OF AN ORGANOPOLYSILOXANE

BACKGROUND OF THE INVENTION

The present invention relates to a method for the preparation of an organopolysiloxane or, more particularly, to a method for the preparation of an organopolysiloxane by the ring-opening or equilibration polymerization of organopolysiloxane oligomers in the presence of an acid catalyst, in which the amount of residual silanolic terminals is greatly decreased so as to impart the organopolysiloxane with improved heat stability and curing characteristics.

It is well known in the art of silicones that a high-polymeric organopolysiloxane can be prepared by the polymerization of organopolysiloxane oligomers in the presence of a strong acid or strong basic compound as the catalyst. When a strong acid is used as the catalyst, it is usual that completion of the polymerization is followed by the neutralization of the acid in the mixture after washing with water by the addition of an alkaline compound such as sodium carbonate, sodium hydrogencarbonate or ammonium carbonate.

A problem in such a process of neutralization by the addition of the alkaline compound is that the neutralization is complete taking a considerably long time because the above mentioned neutralizing agents are each solid. Moreover, the organopolysiloxane prepared in the above described method contains a considerably large amount of silanolic hydroxy groups at many of the molecular chain ends badly affecting the heat stability and curing characteristics of the organopolysiloxane When the polymerization is performed in the presence of an alkaline compound as the catalyst, the alkalinity after completion of the polymerization reaction is neutralized usually using an ammonium halide, alpha-halohydrin and the like while neutralization with such a neutralizing agent can hardly be complete in addition to the problem that the thus neutralized organopolysiloxane necessarily contains more or less of halogen as an impurity to cause various adverse influences. Alternatively, a method has been proposed in Japanese Patent Kokai 60-49033 that the residual alkaline catalyst is neutralized by the addition of a triorgano halosilane and a hexaorgano disilazane. This method, however, is disadvantageous in respect of the low yield of the desired organopolysiloxane.

SUMMARY OF THE INVENTION

The present invention accordingly has an object to provide a method for the preparation of an organopolysiloxane by the acid-catalyzed polymerization of organopolysiloxane oligomers without the above described problems and disadvantages in the prior art methods.

Thus, the method for the preparation of an organopolysiloxane provided by the present invention comprises:

(a) polymerizing organopolysiloxane oligomers in a mixture containing a strong acid as a catalyst to give an organopolysiloxane; and (b) admixing the mixture with water and an organosilicon compound selected from the class consisting of hexaorganodisilazanes represented by the general formula $$(R^1{}_3Si)_2NH, \qquad (I)$$

and triorganosilyl amine compounds represented by the general formula $$R^1{}_3SiNHR^2, \qquad (II)$$

in which each of the groups denoted by $R^1$ and $R^2$ is, independently from the others, a substituted or unsubstituted monovalent hydrocarbon group, in an amount sufficient to neutralize the strong acid as the catalyst and to silylate the terminal silanol groups at the molecular chain ends of the organopolysiloxane.

DETAILED DESCRIPTION OF THE PREFERRED EMBODIMENTS

As is understood from the above given summarizing description, the most characteristic feature of the inventive method is in the step for the neutralization of the acid catalyst after completion of the polymerization reaction to form an organopolysiloxane. Namely, the neutralization is performed by admixing the polymerization mixture with a combination of water and a hexaorgano disilazane of the general formula (I) or a triorganosilyl amine of the formula (II) so that the residual acid catalyst is neutralized by the ammonia produced by the reaction of the disilazane or silyl amine compound with water while the triorganosilyl groups produced by this reaction serve as a silylating agent of the silanol groups which otherwise may remain as such at the molecular chain ends of the organopolysiloxane formed by the polymerization of the starting organopolysiloxane oligomers so that the organopolysiloxane product prepared by this method contains only a greatly decreased amount of the residual terminal silanol groups.

The above described method of the invention is of course applicable to the preparation of any type of organopolysiloxanes including a vinylsilyl-terminated diorganopolysiloxane which can be obtained when the starting mixture of the oligomers contains an organopolysiloxane oligomer providing vinylsilyl terminal groups and a diorganopolysiloxane having a trifluoropropyl silyl group which can be obtained when the starting mixture contains an organopolysiloxane oligomer providing such a silyl group.

The starting material used in the inventive method is an oligomer or a mixture of organopolysiloxane oligomers. Such an oligomeric mixture is usually prepared by the (co)hydrolysis of one or a combination of two kinds or more of various organohalosilanes represented by the general fromula $R^1{}_nSiX_{4-n}$, in which $R^1$ has the same meaning as defined above, X is a halogen atom and n is a positive integer of 1, 2 or 3, and composed of several kinds of oligomeric organopolysiloxanes having a cyclic, straightly linear or branched chain-like molecular structure. It is usual in order to adequately control the average degree of polymerization of the organopolysiloxane product that the starting oligomeric mixture should contain a suitable amount of the species capable of providing the terminal groups of the molecular chain ends of the organopolysiloxane molecules such as hexaorgano disiloxanes, octaorgano trisiloxanes and other low-molecular linear diorganopolysiloxanes as the chain-terminating agent.

The first step of the inventive method is the polymerization of the above mentioned oligomer or oligomeric mixture in the presence of a strong acid as the catalyst. Suitable strong acids include trifluoromethane sulfonic acid, sulfuric acid, hydrochloric acid, nitric acid and the like, of which trifluoromethane sulfonic acid is preferred. The polymerization reaction can be performed at room temperature or at an elevated temperature in the absence of any solvent or in a diluted condition with an organic solvent. The polymerization is a ring-opening or equilibration reaction including the siloxane rearrangement and a high-polymeric organopolysiloxane is produced by the repetition of the condensation reaction between the reactive terminal groups fromed in the presence of the acid catalyst such as silanol groups, silyl ester groups, silyl halide groups and the like.

After completion of the above described polymerization in the first step of the inventive method, the reaction mixture is admixed with water and a hexaorgano disilazane of the general formula (I) or a triorganosilyl amine compound of the general formula (II). The groups denoted by $R^1$ and $R^2$ in the general formulas are each a monovalent hydrocarbon group exemplified by alkyl groups, e.g. methyl, ethyl, propyl and butyl groups, alkenyl groups, e.g. vinyl and allyl groups, aryl groups, e.g. phenyl and tolyl groups, and cycloalkyl groups, e.g. cyclohexyl group, as well as those substituted groups obtained by the replacement of a part or all of the hydrogen atoms in the above named hydrocarbon groups with substituent atoms and/or groups such as halogen atoms, cyano groups and the like. Each of the groups $R^1$ and $R^2$ can be selected from the above exemplified groups independently from the others. Particular examples of the hexaorgano disilazane and triorganosilyl amine compound include: hexamethyl disilazane; 1,3-divinyl-1,1,3,3-tetramethyl disilazane; 1,3-diphenyl-1,1,3,3-tetramethyl disilazane; trimethylsilyl methyl amine; vinyldimethylsilyl methyl amine; phenyldimethylsilyl n-propyl amine; and the like.

In order to completely neutralize the acid catalyst, the amount of the disilazane or silyl amine compound added to the polymerization mixture should be at least equimolar to the residual acid in the mixture or, usually, in the range from 1 to 5 moles or, preferably, from 1.2 to 2.0 moles per mole of the acid. When the disilazane or silyl amine compound is added to the mixture together with water, a reaction takes place to produce ammonia which serves as a neutralizing agent of the acid catalyst while the disilazane or silyl amine compound is converted into an organosilane compound having a triorganosilyl group of the formula $R^1_3Si-$. Such an organosilane compound has an activity as a silylating agent which silylates the terminal silanol groups at the molecular chain ends of the organopolysiloxane produced by the polymerization. Therefore, the organopolysiloxane product obtained by the inventive method contains a greatly decreased amount of residual terminal hydroxy groups or has an increased percentage of the molecular chain ends terminated with triorganosilyl groups.

In practicing the second step of the inventive method, water is first added to the polymerization mixture followed by the addition of the disilazane or silyl amine compound although the order of their addition is not particularly limitative and they can be added in a reverse order or simultaneously. The reaction of neutralization and silylation can proceed even at room temperature to be completed within about two hours. After completion of the reactions, the reaction mixture is heated, if necessary, under reduced pressure to remove the excessive amounts of water and the disilazane or silyl amine compound together with the solvnet, if used, and the low-boiling matters formed in the course of the polymerization. Finally, the mixture is filtered to remove the precipitated ammonium salt of the acid catalyst and the desired organopolysiloxane product is obtained. The disilazane or silyl amine compound used in the neutralization and silylation should preferably have a boiling point of 200° C. or below because, as is mentioned above, the excess amount thereof after completion of the reaction must be completely removed by distillation.

Although the above described method of the present invention is applicable to the preparation of organopolysiloxanes of any types, typical organopolysiloxanes, to the preparation of which the inventive method is applied most successfully, include those expressed by the following structural formulas (1) to (6), in which n, x and y are each a positive integer, denoting methyl, vinyl, phenyl and 3,3,3-trifluoropropyl groups by the symbols of Me, Vi, Ph and Fp, respectively:

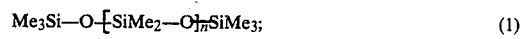  (1)

  (2)

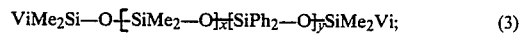  (3)

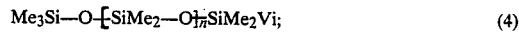  (4)

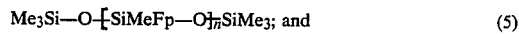  (5)

  (6)

In the following, the method of the present invention is illustrated in more detail by way of examples, in which the values of viscosity are all those obtained by the measurement at 25° C.

EXAMPLE 1

A mixture of 710 g of octamethyl cyclotetrasiloxane and 6.5 g of hexamethyl disiloxane was cooled to 5° C. and admixed with 32 g of concentrated sulfuric acid. After agitation for 4 hours at 40° C., the mixture was admixed with 14 g of water followed by further continued agitation for additional 30 minutes. The depleted acid was removed from the organopolysiloxane by phase separation.

In the next place, the reaction mixture after separation from the acid layer was admixed with 32 g of trimethylsilyl methyl amine to effect neutralization of the residual acid catalyst and silylation of the terminal silanol groups at the molecular chain ends of the organopolysiloxane under agitation at room temperature for 2 hours. Thereafter, the mixture was heated at 180° C. for 6 hours under a reduced pressure of 20 mmHg to remove the low-boiling matters by distillation followed by filtration to remove the ammonium salt of the acid. The product thus obtained in a yield of 86% was a clear dimethylpolysiloxane having a viscosity of 960 centistokes and terminated at both molecular chain ends each with a trimethyl silyl group. The content of silanolic hydroxy groups in this product was only 10 ppm by weight.

For comparison, the same experimental procedure as above was repeated except that the neutralization of the acid catalyst was performed, intead of the admixture of trimethylsilyl methyl amine, by repeating washing with water to give a dimethylpolysiloxane having a viscosity of 1120 centistokes in a yield of 86%. This dimethylpolysiloxane product contained 170 ppm by weight of silanolic hydroxy groups.

EXAMPLE 2

A mixture of 805 g of 1,3,5-trimethyl-1,3,5-tri(3,3,3-trifluoropropyl) cyclotrisiloxane, 163 g of octamethyl cyclotetrasiloxane and 7.5 g of 1,3-divinyl-1,1,3,3-tetramethyl disiloxane was admixed with 0.97 g of trifluoromethane sulfonic acid and agitated at 25° C. for 5 hours to effect the polymerization reaction of the polysiloxanes. Thereafter, the mixture was admixed with a varied amount of water followed by agitation at room temperature for 30 minutes and then with a varied amount of 1,3-divinyl-1,1,3,3-tetramethyl disilazane followed by agitation for additional 2 hours to effect the neutralization and silylation. Thereafter, the mixture was heated at 200° C. for 6 hours under a reduced pressure of 1 mmHg to remove the low-boiling matters by distillation followed by filtration to remove the ammonium salt of the acid catalyst. The thus obtained product was a clear methyl trifluoropropyl polysiloxane terminated at both molecular chain ends each with a vinyl dimethyl silyl groups and having a specific gravity of 1.23. Table 1 below shows the amounts of water and the disilazane compound added to the mixture in moles per mole of the acid catalyst, viscosity of the organopolysiloxane product in centistokes and content of non-volatile matters after heating for 3 hours at 105° C.

A room temperature-curable organopolysiloxane composition was prepared by uniformly blending 100 parts by weight of the thus prepared methyl trifluoropropyl polysiloxane, 0.04 part by weight of 1,3,5,7-tetramethyl-1,3,5,7-tetravinyl cyclotetrasiloxane, 3 parts by weight of an organohydrogen polysiloxane composed of the $Me_2HSiO_{0.5}$ units, $(CF_3 CH_2CH_2)MeSiO$ units and $SiO_2$ units in a molar ratio of 3:2.5:1 and chloroplatinic acid modified with an alcohol in an amount of 12 ppm by weight based on the overall amount of the above named polysiloxane components. The thus prepared room temperature-curable organopolysiloxane composition was cured by standing at 25° C. for 16 hours and the cured composition was examined for the hardness according to JIS and surface tackiness to give the results shown in Table 1.

water and the disilazane compound were 0.4 g and 6 g, respectively. This organopolysiloxane was processed into a room temperature-curable composition in the same formulation as in Example 2 and the curing characteristics of the composition were examined to give the results shown in Table 2 below (Example 3).

In Comparative Example 1, the same experimental procedure as above was repeated except that the neutralization of the acid catalyst was performed, in place of the addition of water and the disilazane compound, by adding 54 g of sodium carbonate to the reaction mixture after completion of the polymerization reaction. The mixture was agitated for 12 hours and then filtered to remove the sodium salt of the acid catalyst followed by stripping at 200° C. for 6 hours to remove the low-boiling matter. The thus obtained methyl trifluoropropyl polysiloxane terminated at both molecular chain ends each with a vinyl dimethyl silyl group had a viscosity of 4970 centistokes.

In Comparative Example 2, the same experimetal procedure as in Example 3 was further repeated except that the neutralization of the acid catalyst was performed by adding 2 g of ammonia water to the reaction mixture followed by agitation for 30 minutes to give a methyl trifluoropropyl polysiloxane terminated at both molecular chain ends each with a vinyl dimethyl silyl group, which had a viscosity of 3990 centistokes.

These three methyl trifluoropropyl polysiloxanes each had a specific gravity of 1.23 at 25° C. and a refractive index $n_D^{25}$ of 1.384. Table 2 below shows the yield of the polysiloxane product by the stripping of the low-boiling matter, content of non-volatile matter in the polysiloxane product after heating for 3 hours at 150° C., content of vinyl groups in moles per 100 g and content of silanolic hydroxy groups in ppm by weight for each of the methyl trifluoropropyl polysiloxanes.

Each of these three polysiloxane products was compounded into a room temperature-curable organopolysiloxane composition in the same formulation as in Example 2 and the curing behavior of the compositions was examined by standing at 25° C. for 16 hours. The results were that the cured composition prepared from the organopolysiloxane obtained in Example 3 had a hardness of 10 by the JIS scale while the composition

TABLE 1

| Water added, moles per moles of acid catalyst | Disilazane added, moles per moles of acid catalyst | Organopolysiloxane | | Cured Composition | |
|---|---|---|---|---|---|
| | | Viscosity, centistokes | Non-volatile matter, % | Hardness, JIS | Surface tackiness |
| 6 | 5 | 3600 | 98 | 5 | yes |
| 5 | 2 | 3700 | 98 | 8 | no |
| 2 | 2 | 3600 | 99 | 10 | no |
| 0 | 2 | 3700 | 99 | 5 | yes |

EXAMPLE 3 AND COMPARATIVE EXAMPLES 1 AND 2

A clear methyl trifluoropropyl polysiloxane having a viscosity of 3660 centistokes was prepared in the same manner as in Example 2 except that the amounts of prepared from the organopolysiloxane obtained in Comparative Example 1 was gelled to give no cured composition and the cured composition from the polysiloxane obtained in Comparative Example 2 had no measurable hardness.

TABLE 2

| | Yield by stripping, % | Non-volatile matter after 3 hours at 150° C., % | Content of vinyl groups, moles/100 g | Content of silanolic hydroxy groups, ppm by weight |
|---|---|---|---|---|
| Example 3 | 88 | 98 | 0.0082 | 9 |
| Comparative Example 1 | 88 | 98 | 0.0077 | 120 |
| Comparative | 84 | 97 | 0.0080 | 100 |

TABLE 2-continued

| | Yield by stripping, % | Non-volatile matter after 3 hours at 150° C., % | Content of vinyl groups, moles/100 g | Content of silanolic hydroxy groups, ppm by weight |
|---|---|---|---|---|
| Example 2 | | | | |

EXAMPLE 4 AND COMPARATIVE EXAMPLE 3

To a mixture of 4680 g of 1,3,5-trimethyl-1,3,5-tri(3,3,3-trifluoropropyl) cyclotrisiloxane and 56 g of 1,3-divinyl-1,1,3,3-tetramethyl disilazane were added 2.4 g of trifluoromethane sulfonic acid and the mixture was agitated for 5 hours at 35° C. to effect the polymerization reaction. Thereafter, the mixture was admixed with 0.6 g of water followed by agitation for 30 minutes and then with 6 g of 1,3-divinyl-1,1,3,3-tetramethyl disilazane followed by agitation for additional 2 hours to effect neutralization and silylation. The mixture was then heated at 200° C. for 6 hours under a reduced pressure of 1 mmHg to remove the low boiling matter by distillation followed by filtration to remove the precipitated ammonium salt of the acid catalyst. The product thus obtained in a yield of 80% was a clear methyl trifluoropropyl polysiloxane terminated at both molecular chain ends each with a vinyl dimethyl silyl group and had a viscosity of 5500 centistokes.

For comparison (Comparative Example 3), the same starting polysiloxane mixture as above was admixed with 0.45 g of calcium hydroxide as the catalyst for the polymerization and heated at 70° C. for 16 hours to effect polymerization. Thereafter, the alkalinity of the mixture after cooling was neutralized by the addition of a mixture of 0.49 g of vinyl dimethyl chlorosilane and 4.4 g of hexamethyl disilazane and agitation for 2 hours followed by heating at 180° C. for 6 hours under a reduced pressure of 1 mmHg to remove the low-boiling matter and then filtration to remove the precipitated salt to give a clear and viscous product of a methyl trifluoropropyl polysiloxane having a viscosity of 4800 centistokes. The yield of the product was 60% indicating that the inventive method was much more advantageous in respect of the yield of the product.

EXAMPLE 5

A mixture composed of 7100 g of octamethyl cyclotetrasiloxane, 32 g of hexamethyl disiloxane and 37 g of 1,3-divinyl-1,1,3,3-tetramethyl disiloxane was admixed with 1.8 g of trifluoromethane sulfonic acid as the catalyst and agitated for 6 hours at 25° C. to effect the polymerization reaction. Thereafter, the mixture was admixed with 0.2 g of water followed by agitation for 30 minutes and then with 4.0 g of hexamethyl disilazane followed by agitation for additional 2 hours to effect neutralization and silylation. The mixture was then heated at 180° C. for 6 hours under a reduced pressure of 20 mmHg to remove the low-boiling matter and filtered to remove the precipitated ammonium salt of the acid catalyst. The clear and viscous product obtained in this manner in a yield of 86% was a dimethylpolysiloxane having a viscosity of 990 centistokes and terminated at both molecular chain ends each with a vinyl dimethyl silyl group. The content of vinyl groups therein was 0.0028 mole per 100 g and the content of the silanolic hydroxy groups was 10 ppm by weight.

What is claimed is:

1. A method for the preparation of an organopolysiloxane which comprises:
   (a) polymerizing an organopolysiloxane oligomer or a mixture of organopolysiloxane oligomers in a mixture containing a strong acid as a catalyst to give an organopolysiloxane; and
   (b) admixing the mixture with water and an organosilicon compound selected from the class consisting of hexaorganodisilazanes represented by the general formula $(R^1{}_3Si)_2NH$ and triorganosilyl amine compounds represented by the general formula $R^1{}_3SiNHR^2$, in which each of the groups denoted by $R^1$ and $R^2$ is, independently from the others, a substituted or unsubstituted monovalent hydrocarbon group, in an amount sufficient to neutralize the strong acid as the catalyst and to silylate the terminal silanol groups at the molecular chain ends of the organopolysiloxane.

2. The method for the preparation of an organopolysiloxane as claimed in claim 1 wherein the amounts of water and the organosilicon compound added to the mixture are each in the range from 1 to 5 moles per mole of the strong acid as the catalyst.

3. The method for the preparation of an organopolysiloxane as claimed in claim 1 wherein the strong acid as the catalyst is trifluoromethane sulfonic acid.

* * * * *

UNITED STATES PATENT AND TRADEMARK OFFICE
CERTIFICATE OF CORRECTION

PATENT NO. : 4,722,987
DATED : February 2, 1988
INVENTOR(S) : Masayuki Ikeno, Hiroshi Inomata It is certified that error appears in the above-identified patent and that said Letters Patent is hereby corrected as shown below:

Claim 1, line 39 reads:

strong acid as the catalyst and to ailylate the termiit should read:

strong acid as the catalyst and to silylate the termi-

Signed and Sealed this

Twenty-seventh Day of December, 1988

Attest:

DONALD J. QUIGG

Attesting Officer

Commissioner of Patents and Trademarks